Jan. 18, 1927.  
O. E. GRIGSBY  
1,615,078  
WEATHER SHIELD AND GLARE VISOR  
Filed Nov. 13, 1922  2 Sheets-Sheet 1

Inventor.  
Owen E. Grigsby.  
By Gabel & Mueller  
Attys.

Jan. 18, 1927.  1,615,078
O. E. GRIGSBY
WEATHER SHIELD AND GLARE VISOR
Filed Nov. 13, 1922   2 Sheets-Sheet 2
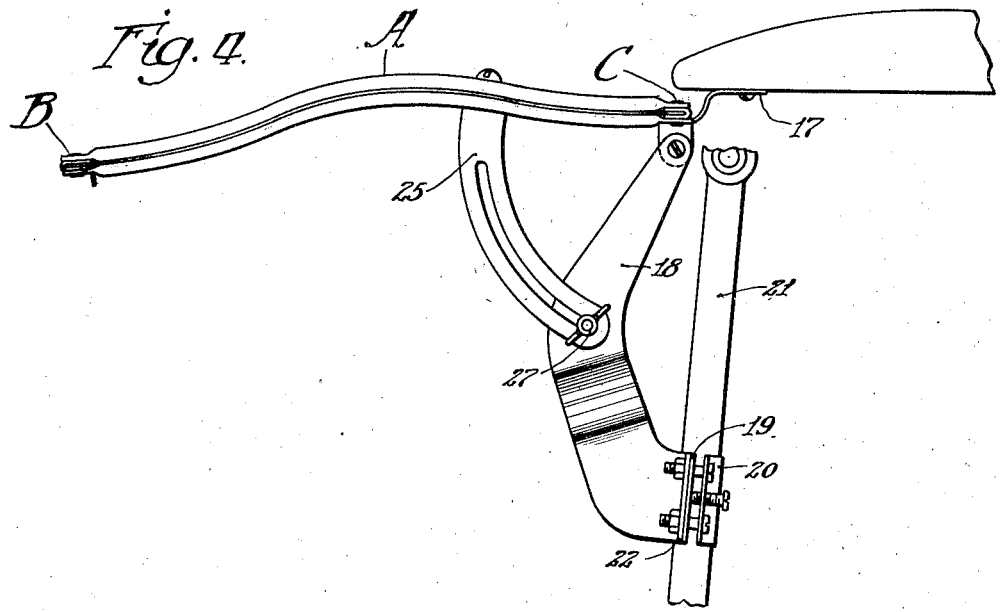
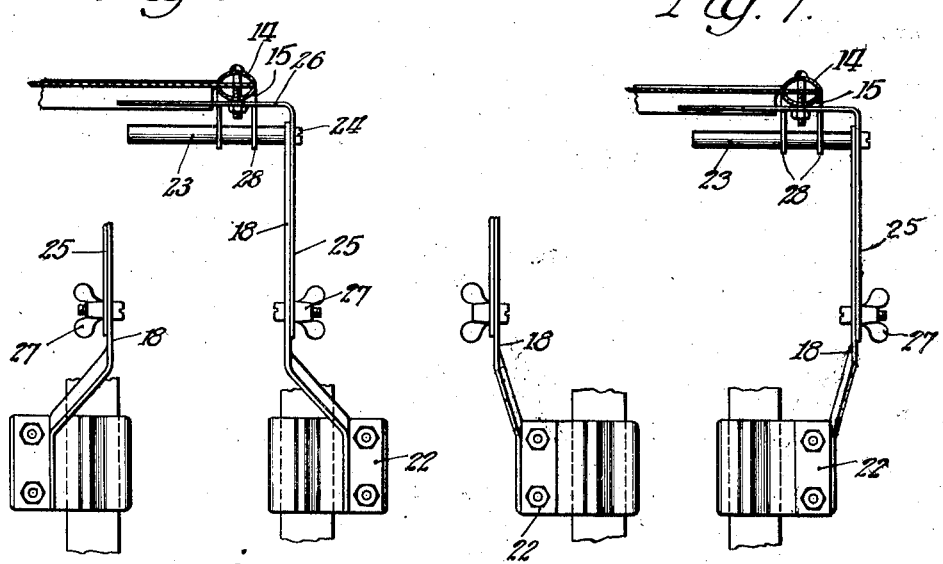
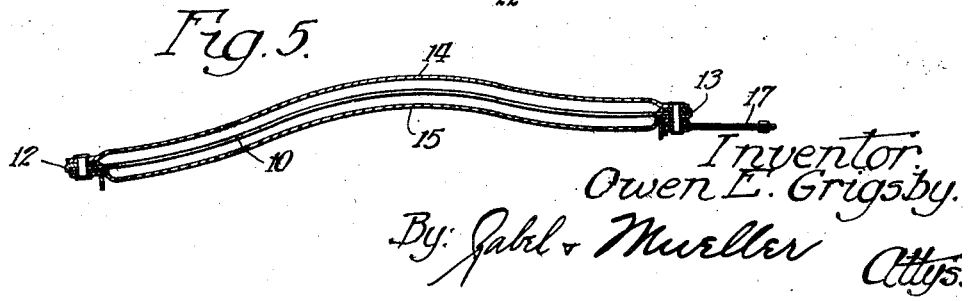
Inventor
Owen E. Grigsby.
By Gabel & Mueller
Attys.

Patented Jan. 18, 1927.

1,615,078

UNITED STATES PATENT OFFICE.

OWEN E. GRIGSBY, OF PARK RIDGE, ILLINOIS, ASSIGNOR TO GRIGSBY-GRUNOW-HINDS CO., OF CHICAGO, ILLINOIS, A CORPORATION OF ILLINOIS.

WEATHER SHIELD AND GLARE VISOR.

Application filed November 13, 1922. Serial No. 600,702.

My invention relates to weather shield and glare visors and has to do more particularly with devices of this character which are ordinarily mounted in front of the windshields on automobiles, an object being to provide an improved device of this character.

More particularly, my present invention relates to improvements over the visor shown in my application Patent No. 1,502,382, there being certain features of construction and arrangement of parts herein having structural and operating advantages over what has heretofore been done.

One of the features of the present visor is the provision of an improved bracket arrangement whereby a visor of intermediate length may be mounted upon windshield uprights of a considerable range among the present commercial automobiles, by a reversible bracket which always bears the same general relation to the visor body. That is, it has reversibility and lateral adjustment while always remaining beyond the outer ends of the visor.

Another feature of my invention is the provision of a new and improved transverse curvature of the visor body, which not only gives it a distinctive and attractive appearance, but also adds strength thereto.

For a better understanding of my invention reference is to be had to the accompanying drawings, in which Fig. 1 is a perspective view showing my improved visor attached to the windshield uprights of the ordinary touring type of body;

Fig. 4 is an enlarged end view of the visor of Fig. 1;

Fig. 5 is a transverse sectional view through the center cross piece along the line 5—5 of Fig. 2;

Fig. 6 is an enlarged view of the brackets showing them adjusted for mounting on the wider cars; and Fig. 7 shows the brackets reversed as used for mounting on the narrower cars.

Figure 1:
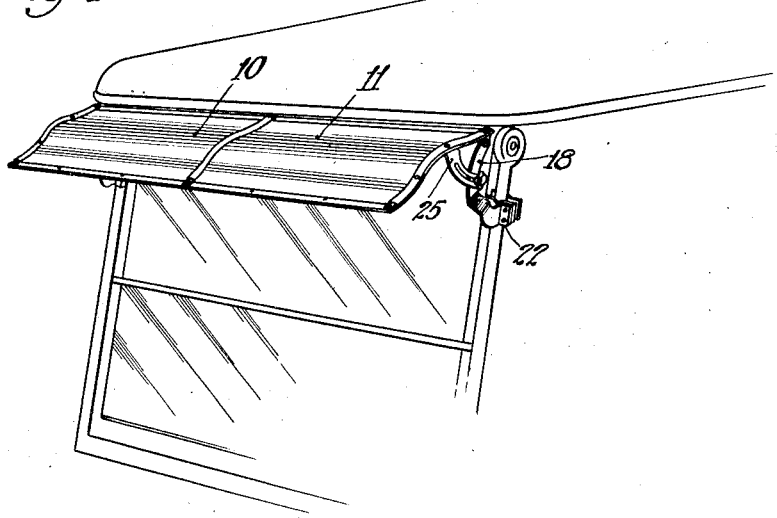
Figure 2:
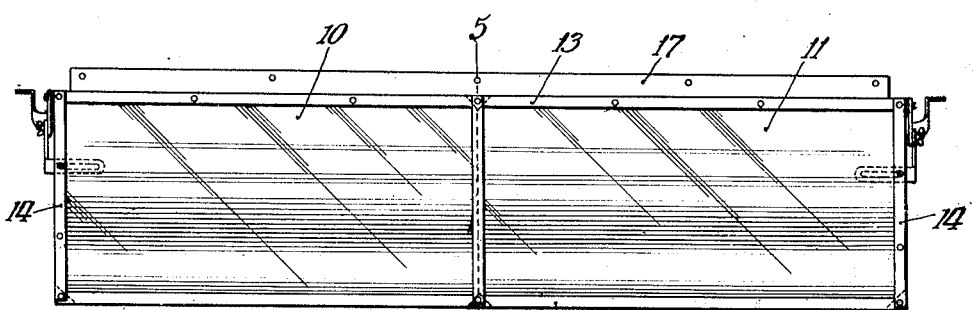
Fig. 2 is a plan view of the visor of Fig. 1, but detached from the car.

Referring now more in detail to my invention as illustrated, it comprises a body member preferably made up of a rectangular marginal frame having a suitable sheeting mounted therein. For this purpose I preferably provide a translucent material, using pyralin a very suitable material for this purpose. In the preferred arrangement I employ two sections 10, 11 which overlap at the center of the visor as indicated by the dotted line in Fig. 2. The supporting frame for the sheeting comprises preferably front and back channel sections 12, 13, and end sections each consisting of an upper cross bar 14 and lower cross bar 15. The end sections, as well as the center section, each comprises a like arrangement consisting of the upper channel member as 14 and the lower channel member as 15, formed out of sheet aluminum, as is the rest of the frame. The end cross pieces and longitudinal sections are joined together at the corners by rivets, the sheeting being clamped therebetween.

Now as to the visor body, I construct this in a distinctive curved manner, having a central bulge section A, gradually curving out into straight ends B and C. Not only do I secure a new, individual and pleasing design, but also added strength in resisting the air pressure, etc. By curving the sheeting I add strength and resisting power to it and I provide a further feature in the method of mounting this sheeting which permits it to more readily return to its normal position if forced out of shape or dented from the wind pressure or a violent blow. To this end I preferably clamp the sheeting throughout a part only of the marginal frame, preferably at the end sections and along the back, but leave the front edge freely slidable in the channel 12. I find that with this arrangement if the sheeting is pressed down it does not remain distorted, nor will it wrinkle due to expansion or contraction by change in temperature, but readily returns to its normal plane. It is also to be noted that I preferably do not clamp the sheeting along the center section, thus permitting more freedom of movement.

Figure 3:
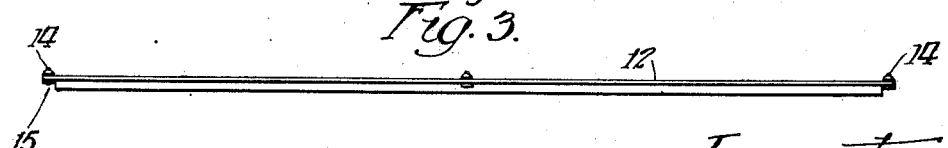
Fig. 3 is a front edge view of the visor member of Fig. 2.

In connection with the building up of the marginal frame it is to be noted that the three top cross pieces, as well as the lower ones of the two ends, are fastened to the outside of the channel sections 12, 13. The lower portion of the center section is also fastened to the outside of the channel pieces, but instead of cutting the lower web of the channels away to receive the ends of the lower center section, as is done at the ends, I simply pierce the web so as to permit the flat end of the cross bar to pass through as shown in Figs. 3 and 5.

I also preferably provide a weather strip 17 which is attached to the back edge of the frame, and containing a steel reinforcing strip sewed therein so as to strengthen the frame.

Referring to the pyralin or celluloid sheeting, I preferably form this before placing it in the frame so as to give it a permanent set. This, I have discovered, gives certain advantages among which is added strength and resistance against distortion from undue pressure. Also if pressed out of shape it more readily springs back into its normal curvature and retains it.

To this end I preferably heat the sheeting while clamped between plates or sheets conforming in curvature to that of the frame and then chill it so as to give it a set. For this purpose I employ two sheet metal plates of sufficient strength, about $\frac{1}{16}''$ thick, and the proper curvature, and place the sheeting between them. The plates are then clamped together so as to shape the celluloid. I then heat the whole thing, preferably by dipping it in water sufficiently hot to soften the sheeting, using water for this purpose of about 210 degrees Fahrenheit, leaving it in about ten seconds. This water is below boiling point and of course should be hot enough to soften the sheeting sufficiently for forming but not enough to burn or ruin the high polish on the pyralin. I then quickly transfer it to chill the sheeting by dipping the press with the sheeting in it in cold water, of about 60 degrees Fahrenheit, leaving it there long enough to cool off, about five to ten seconds. This causes the sheeting to set and it is then removed from the press having acquired a shape substantially that of the press plates which is like that of the visor frame.

Now as to the brackets for mounting the visor, I provide a novel arrangement whereby they are preferably always mounted or attached to the visor and extend beyond the outer ends thereof, but are slidably adjustable and reversibly offset so that the device may be secured to windshield uprights of various distances apart.

The brackets consist of right and left hand offset body members 18, having attaching clamps 19, 20 carried at the lower end. These clamps are so arranged as to embrace the windshield uprights or standards 21. Or the clamping plates may be removed and the flanged portion 22 of the bracket secured directly to the face of the windshield frame, as in the ordinary closed body. The visor is preferably pivotally supported by the brackets 18, and to this end a reversible stud 23 is employed, being preferably held by a screw 24 so that the stud may be mounted upon either side of the bracket as shown in Figs. 6 and 7. A brace 25 is also employed, being laterally adjustable due to the slotted arm 26 by means of which it is clamped to the visor. The vertical arm is slidably attached to the brace 18 and is clamped in position by the bolt and thumb nut 27. The shaft 23 on the bracket extends slidably through a yoke piece 28. Thus, by means of the adjustment of the shaft 23 and brace arm 26, the bracket is laterally adjustable relative to the visor within the range of the length of these elements 23, 26.

In mounting the brackets so as to attach the visor to cars having the wider windshield uprights, the brackets are mounted with the offset as indicated in Fig. 6.

If the visor is to be attached to the cars having the narrower windshields, that is, in which the uprights are closer together than what would receive the clamps with the brackets mounted as in Fig. 6, the bracket uprights 18 are reversed as shown in Fig. 7, and the braces 25 and studs 23 moved to the opposite sides of the brackets. Thus the lower or attaching ends of the bracket may be brought closer together for mounting upon the narrower windshields, as will be seen from Fig. 7.

What I claim as new and desire to secure by United States Letters Patent is:

1. A weather shield and visor for automobiles comprising a visor member, right and left hand bracket members for attaching the visor to windshield uprights, each bracket including an upright attaching portion, an upwardly extending bracket arm, and reversible extensions on the arms for securing the upper end of the arm to the visor to support the same; said bracket arms being oppositely laterally offset and reversible and the extensions reversed whereby the attaching portions of the brackets are attachable to windshield uprights of different distances apart with the bracket arms always on the outer ends of the visor member.

2. A weather shield and visor for automobiles comprising a visor member, right and left hand bracket members for attaching the visor to windshield uprights, each bracket including an upright attaching portion, an upwardly extending bracket arm, and a slidable connection for securing the upper end of the arm to the visor to support the same; said arms being oppositely laterally offset intermediate their ends and reversible whereby the attaching portions of the brackets are attachable to windshield uprights of different distances apart, said connection for securing the arm to the visor being laterally adjustable to afford additional lateral variation of upright attachment.

3. A visor body comprising a marginal frame transversely shaped with a prominent center arch and two immediately adjacent minor curves one on either side of the center arch whose radii are opposite to that of the center arch, and a translucent sheeting preformed to substantially conform to the transverse shape of the frame and held therein.

4. In a weather shield for automobiles, a translucent body sheeting of hard elastic material preformed to an inherent transverse triple curvature substantially throughout its width comprising a central convex portion the ends of which inversely curving into front and back extending portions.

In witness whereof, I hereunto subscribe my name this 14th day of October A. D., 1922.

OWEN E. GRIGSBY.